(12) United States Patent
Sasaki et al.

(10) Patent No.: US 12,744,215 B2
(45) **Date of Patent: *Sep. 22, 2026**

(54) POSITIVE-ELECTRODE MATERIAL AND BATTERY

(71) Applicant: Panasonic Intellectual Property Management Co., Ltd., Osaka (JP)

(72) Inventors: Izuru Sasaki, Aichi (JP); Takashi Kubo, Hyogo (JP); Kazuya Hashimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 736 days.

This patent is subject to a terminal disclaimer.

(21) Appl. No.: 18/153,354

(22) Filed: Jan. 12, 2023

(65) Prior Publication Data

US 2023/0197960 A1 Jun. 22, 2023

Related U.S. Application Data

(63) Continuation of application No. PCT/JP2021/025292, filed on Jul. 5, 2021.

(30) Foreign Application Priority Data

Jul. 22, 2020 (JP) ................................ 2020-125305
Dec. 28, 2020 (JP) ................................ 2020-219572

(51) Int. Cl.
*H01M 4/62* (2006.01)
*H01M 4/36* (2006.01)
(Continued)

(52) U.S. Cl.
CPC ............. *H01M 4/62* (2013.01); *H01M 4/366* (2013.01); *H01M 4/505* (2013.01); *H01M 4/525* (2013.01);
(Continued)

(58) Field of Classification Search
CPC .. H01M 4/62; H01M 4/505; H01M 2300/008; H01M 2300/0068
See application file for complete search history.

(56) References Cited

U.S. PATENT DOCUMENTS 10,547,055 B2 1/2020 Matsuda
11,524,902 B2 12/2022 Asano et al.
(Continued)

FOREIGN PATENT DOCUMENTS

CN 109873207 A 6/2019
CN 111201643 A 5/2020
(Continued)

OTHER PUBLICATIONS

International Search Report of PCT application No. PCT/JP2021/025292 dated Aug. 31, 2021.
(Continued)

*Primary Examiner* — Nicholas A Smith
*Assistant Examiner* — Ziheng Lu
(74) *Attorney, Agent, or Firm* — Rimon P.C.

(57) ABSTRACT

A positive-electrode material includes a positive-electrode active material and a coating layer coating at least partially the surface of the positive-electrode active material and containing a first solid electrolyte. The first solid electrolyte is represented by Composition formula (1): $Li_{\alpha1}M1_{\beta1}X1_{\gamma1}$ . . . Formula (1) where, in Composition formula (1), α1, β1, and γ1 are each independently a positive real number, M1 includes calcium, yttrium, and at least one rare-earth element other than yttrium, and X1 includes at least one selected from the group consisting of F, Cl, Br, and I.

14 Claims, 2 Drawing Sheets

(51) Int. Cl.

| | |
|---|---|
| ***H01M 4/505*** | (2010.01) |
| ***H01M 4/525*** | (2010.01) |
| ***H01M 10/0562*** | (2010.01) |
| *H01M 4/02* | (2006.01) |

(52) U.S. Cl.
CPC .. *H01M 10/0562* (2013.01); *H01M 2004/028* (2013.01); *H01M 2300/0068* (2013.01); *H01M 2300/008* (2013.01)

(56) References Cited

U.S. PATENT DOCUMENTS

| | | | | |
|---|---|---|---|---|
| 11,605,833 | B2 | 3/2023 | Isojima et al. | |
| 11,637,315 | B2 | 4/2023 | Ouspenski et al. | |
| 11,848,414 | B2 | 12/2023 | Assat et al. | |
| 12,132,171 | B2 | 10/2024 | Isohima et al. | |
| 12,288,844 | B2 | 4/2025 | Kubo et al. | |
| 12,308,384 | B2 | 5/2025 | Assat et al. | |
| 12,451,513 | B2 * | 10/2025 | Nishio | H01M 10/0562 |
| 12,525,642 | B2 | 1/2026 | Nakama et al. | |
| 2009/0081554 | A1 | 3/2009 | Takada et al. | |
| 2011/0027551 | A1 * | 2/2011 | Huang | B32B 7/06 156/60 |
| 2011/0027661 | A1 * | 2/2011 | Okazaki | H01M 4/525 29/623.5 |
| 2011/0057151 | A1 | 3/2011 | Chen et al. | |
| 2014/0087270 | A1 | 3/2014 | Yoshida | |
| 2016/0268661 | A1 | 9/2016 | Kim et al. | |
| 2018/0090752 | A1 | 3/2018 | Fujiki et al. | |
| 2019/0088949 | A1 | 3/2019 | Makino et al. | |
| 2019/0088995 | A1 | 3/2019 | Asano et al. | |
| 2019/0386322 | A1 | 12/2019 | Yawata et al. | |
| 2020/0119362 | A1 | 4/2020 | Furusawa et al. | |
| 2020/0127325 | A1 | 4/2020 | Takahashi et al. | |
| 2020/0144575 | A1 | 5/2020 | Ku et al. | |
| 2020/0184253 | A1 | 6/2020 | Butscher et al. | |
| 2020/0212481 | A1 | 7/2020 | Nagamine et al. | |
| 2020/0328453 | A1 | 10/2020 | Sakai et al. | |
| 2020/0328459 | A1 * | 10/2020 | Sakai | H01M 4/485 |
| 2020/0328460 | A1 * | 10/2020 | Asano | C01G 9/006 |
| 2020/0328467 | A1 | 10/2020 | Sasaki et al. | |
| 2020/0343554 | A1 | 10/2020 | Oshima et al. | |
| 2020/0350615 | A1 | 11/2020 | Sakaida et al. | |
| 2020/0350626 | A1 | 11/2020 | Matsumura et al. | |
| 2021/0143470 | A1 | 5/2021 | Sugimoto et al. | |
| 2021/0143474 | A1 | 5/2021 | Sugimoto et al. | |
| 2021/0218054 | A1 | 7/2021 | Oshima et al. | |
| 2021/0273259 | A1 | 9/2021 | Nagamine et al. | |
| 2021/0328262 | A1 * | 10/2021 | Nishio | H01M 10/0525 |
| 2021/0376377 | A1 | 12/2021 | Tanaka et al. | |
| 2022/0209291 | A1 | 6/2022 | Kubo et al. | |
| 2022/0246983 | A1 | 8/2022 | Suzuki et al. | |
| 2022/0255125 | A1 | 8/2022 | Suzuki et al. | |
| 2022/0285721 | A1 | 9/2022 | Miyatake et al. | |
| 2022/0294008 | A1 | 9/2022 | Kambara et al. | |
| 2022/0294012 | A1 | 9/2022 | Nishio et al. | |
| 2022/0320571 | A1 * | 10/2022 | Hirano | H01M 10/0562 |
| 2022/0367845 | A1 | 11/2022 | Sasaki et al. | |
| 2023/0163299 | A1 * | 5/2023 | Nagamine | H01M 4/582 429/231.95 |
| 2024/0194868 | A1 * | 6/2024 | Hayashi | H01M 10/0562 |
| 2024/0413385 | A1 | 12/2024 | Ueno et al. | |
| 2026/0024806 | A1 | 1/2026 | Nishio et al. | |

FOREIGN PATENT DOCUMENTS

| | | | | |
|---|---|---|---|---|
| CN | 112771626 | A | 5/2021 | |
| EP | 3467845 | A1 | 4/2019 | |
| EP | 4044291 | A1 | 8/2022 | |
| EP | 4084120 | A1 | 11/2022 | |
| EP | 4102594 | A1 | 12/2022 | |
| JP | 2016-139511 | A | 8/2016 | |
| WO | 2007/004590 | A1 | 1/2007 | |
| WO | 2015/144074 | A1 | 10/2015 | |
| WO | 2018/025582 | | 2/2018 | |
| WO | 2018/168505 | A1 | 9/2018 | |
| WO | 2019/135315 | A1 | 7/2019 | |
| WO | 2019/135322 | A1 | 7/2019 | |
| WO | WO-2019135319 | A1 * | 7/2019 | H01M 50/431 |
| WO | WO-2019135343 | A1 * | 7/2019 | C01F 17/36 |
| WO | 2019/146218 | A1 | 8/2019 | |
| WO | 2019/146236 | A1 | 8/2019 | |
| WO | 2020/100465 | A1 | 5/2020 | |
| WO | 2020/137026 | | 7/2020 | |
| WO | 2020/137189 | | 7/2020 | |
| WO | 2020/137389 | A1 | 7/2020 | |
| WO | 2020/137390 | A1 | 7/2020 | |
| WO | 2020/137391 | A1 | 7/2020 | |
| WO | WO-2020137189 | A1 * | 7/2020 | H01M 10/0562 |
| WO | 2021/070595 | A1 | 4/2021 | |
| WO | 2021/131716 | A1 | 7/2021 | |
| WO | 2021/157361 | A1 | 8/2021 | |

OTHER PUBLICATIONS

Masahiro Tatsumisago et al., "All-solid-state lithium secondary batteries using sulfide-based glass-ceramic electrolytes", Journal of Power Sources 159(2006), May 24, 2006, pp. 193-199.

The EPC Office Action dated Jul. 3, 2024 for the related European Patent Application No. EP21846770.2.

Notice of Allowance dated Feb. 2, 2026 issued in related U.S. Appl. No. 17/842,546.

Non-Final Office Action dated Dec. 29, 2025 issued in related U.S. Appl. No. 18/153,354.

Notice of Allowance dated Feb. 11, 2026 issued in related U.S. Appl. No. 18/444,615.

International Search Report issued on Mar. 9, 2021 in International Patent Application No. PCT/JP2020/045914, with English translation.

International Search Report of PCT application No. PCT/JP2021/025293 dated Aug. 24, 2021.

International Search Report of PCT application No. PCT/JP2022/027342 dated Sep. 27, 2022.

Extended European Search Report dated May 27, 2024 issued in the corresponding European Patent Application No. 20906558.0.

The EPC Office Action dated Jul. 3, 2024 for the related European Patent Application No. 21845968.3.

The EPC Office Action dated Sep. 9, 2025 for the related European Patent Application No. 22864061.1.

Chinese Search Report dated Jun. 28, 2024 issued in the corresponding Chinese Patent Application No. 202080088589.9, with English translation.

Atsushi Sakuda et al., "Interfacial Observation between LiCoO2 Electrode and Li2S—P2S5 Solid Electrolytes of All-Solid-State Lithium Secondary Batteries Using Transmission Electron Microscopy", Chemistry of Materials, American Chemical Society, 2010, vol. 22, No. 3, Sep. 25, 2009, pp. 949-956.

A. Zevgolis et al., "Alloying Effects on Superionic Conductivity in Lithium Indium Halides for All-Solid-State Batteries", Applied Physics Letters Materials, Nov. 1, 2017, pp. 1-14.

Non-Final Office Action dated Feb. 6, 2025 issued in U.S. Appl. No. 17/842,546.

Non-Final Office Action dated Jul. 17, 2025 issued in U.S. Appl. No. 17/842,546.

Final Office Action dated Dec. 4, 2025 issued in U.S. Appl. No. 17/842,546.

Non-Final Office Action dated Jul. 23, 2025 issued in U.S. Appl. No. 18/153,364.

Non-Final Office Action dated Aug. 7, 2025 issued in U.S. Appl. No. 18/444,615.

Final Office Action dated Dec. 3, 2025 issued in U.S. Appl. No. 18/444,615.

Notice of Allowance dated Dec. 9, 2025 issued in U.S. Appl. No. 18/153,364.

Search Report dated Jan. 13, 2026 for the corresponding Chinese Patent Application No. 202180061394.X, with English translation.

(56) References Cited

OTHER PUBLICATIONS

The Indian Office Action dated May 29, 2026 for the related Indian Patent Application No. 202347003072.

* cited by examiner

POSITIVE-ELECTRODE MATERIAL AND BATTERY

BACKGROUND

1. Technical Field

The present disclosure relates to a positive-electrode material for a battery and a battery.

2. Description of the Related Art

International Publication No. 2018/025582 discloses a battery using a halide as a solid electrolyte. Journal of Power Sources 159(2006), p193-199 discloses a battery using a sulfide as a solid electrolyte.

SUMMARY

One non-limiting and exemplary embodiment provides a positive-electrode material that enables an increase in the charge-discharge efficiency of a battery.

In one general aspect, the techniques disclosed here feature a positive-electrode material including a positive-electrode active material; and a coating layer coating at least partially a surface of the positive-electrode active material and containing a first solid electrolyte, wherein the first solid electrolyte is represented by Composition formula (1) below, $Li_{\alpha1}M1_{\beta1}X1_{\gamma1}$ Formula (1) where, in Composition formula (1) above, $\alpha1$, $\beta1$, and $\gamma1$ are each independently a positive real number, M1 includes calcium, yttrium, and at least one rare-earth element other than yttrium, and X1 includes at least one selected from the group consisting of F, Cl, Br, and I.

The present disclosure enables an increase in the charge-discharge efficiency of a battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
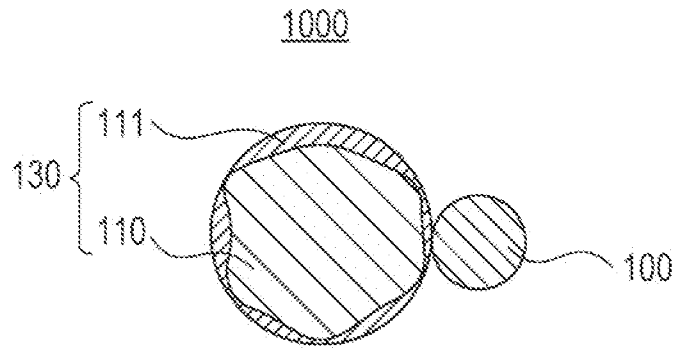
FIG. 1 is a sectional view illustrating the schematic configuration of a positive-electrode material according to Embodiment 1.

Underlying Knowledge Forming Basis of the Present Disclosure

International Publication No. 2018/025582 states that an all-solid-state secondary battery containing a solid electrolyte formed of a halide containing Cl or Br provides good charge-discharge characteristics.

On the other hand, the present inventors performed thorough studies and, as a result, have found that the ion conductivity of a solid electrolyte in contact with a positive-electrode active material contributes to the charge-discharge efficiency of the battery. For example, when the solid electrolyte in contact with the positive-electrode active material has a low ion conductivity, the battery also has a low charge-discharge efficiency. In order to address such a problem, a solid electrolyte having a higher ion conductivity needs to be in contact with the positive-electrode active material.

Journal of Power Sources 159(2006), p193-199 states that an all-solid-state secondary battery containing a sulfide solid electrolyte exhibits good charge-discharge characteristics.

On the other hand, the present inventors performed thorough studies and, as a result, have found that contact between the positive-electrode active material and the sulfide solid electrolyte results in, during charging, oxidation-decomposition of the sulfide solid electrolyte. The oxidation-decomposition of the solid electrolyte causes a decrease in the charge-discharge efficiency of the battery. In order to address such a problem, a solid electrolyte that has oxidation stability, in other words, that is less likely to be oxidized needs to be in contact with the positive-electrode active material.

The present inventors then considered that the state of contact between the positive-electrode active material and the solid electrolyte may be achieved by coating, with a solid electrolyte having oxidation stability, the surface of the positive-electrode active material. In particular, halide solid electrolytes have higher oxidation stability than the sulfide solid electrolyte, so that the coating layer of such a halide solid electrolyte can be used to suppress oxidation-decomposition of another solid electrolyte.

On the basis of such knowledge, the present inventors have conceived a positive-electrode material according to the present disclosure that enables an increase in the charge-discharge efficiency of a battery.

SUMMARY OF ASPECTS ACCORDING TO THE PRESENT DISCLOSURE

A positive-electrode material according to a 1st aspect of the present disclosure includes:

a positive-electrode active material; and a coating layer coating at least partially a surface of the positive-electrode active material and containing a first solid electrolyte, wherein the first solid electrolyte is represented by Composition formula (1) below, $$Li_{\alpha1}M1_{\beta1}X1_{\gamma1} \quad \text{Formula (1)}$$

where, in Composition formula (1) above, $\alpha1$, $\beta1$, and $\gamma1$ are each independently a positive real number, M1 includes calcium, yttrium, and at least one rare-earth element other than yttrium, and X1 includes at least one selected from the group consisting of F, Cl, Br, and I.

Such features enable an increase in the charge-discharge efficiency of a battery.

For a 2nd aspect according to the present disclosure, for example, in the positive-electrode material according to the 1st aspect, the first solid electrolyte may be represented by Composition formula (2) below, $$Li_{6-2a-3d}Ca_a(Y_{1-b}Gd_b)_dBr_{6-c}Cl_c \quad \text{Formula (2)}$$

where Composition formula (2) above satisfies $0<a$, $0<b<1$, $0<c<6$, and $0<d<1.5$. The positive-electrode material containing the first solid electrolyte represented by Composition formula (2) enables a further increase in the charge-discharge efficiency of a battery.

For a 3rd aspect according to the present disclosure, for example, in the positive-electrode material according to the 2nd aspect, Composition formula (2) above may satisfy $0.01 \le a \le 0.3$. Such a feature enables a further increase in the charge-discharge efficiency of a battery.

For a 4th aspect according to the present disclosure, for example, in the positive-electrode material according to the 3rd aspect, Composition formula (2) above may satisfy $a \le 0.2$. Such a feature enables a further increase in the charge-discharge efficiency of a battery.

For a 5th aspect according to the present disclosure, for example, in the positive-electrode material according to any one of the 2nd to 4th aspects, Composition formula (2) above may satisfy $0.1 \le b \le 0.9$. Such a feature enables a further increase in the charge-discharge efficiency of a battery.

For a 6th aspect according to the present disclosure, for example, in the positive-electrode material according to any one of the 2nd to 4th aspects, Composition formula (2) above may satisfy $0.8 \le b < 1$. Such a feature enables a further increase in the charge-discharge efficiency of a battery.

For a 7th aspect according to the present disclosure, for example, in the positive-electrode material according to any one of the 2nd to 6th aspects, Composition formula (2) above may satisfy $1.0 \le c \le 1.2$. Such a feature enables a further increase in the charge-discharge efficiency of a battery.

For an 8th aspect according to the present disclosure, for example, in the positive-electrode material according to any one of the 1st to 7th aspects, the positive-electrode active material may contain Ni, Co, and Mn. Such a feature enables a further increase in the energy density and charge-discharge efficiency of a battery.

For a 9th aspect according to the present disclosure, for example, the positive-electrode material according to any one of the 1st to 8th aspects may further include a second solid electrolyte. Such a feature enables sufficient ensuring of ion conductivity in the positive-electrode material.

For a 10th aspect according to the present disclosure, for example, in the positive-electrode material according to the 9th aspect, the second solid electrolyte may be represented by Composition formula (3) below, $$Li_{\alpha 2}M2_{\beta 2}X2_{\gamma 2} \quad \text{Formula (3)}$$

where, in Composition formula (3) above, $\alpha 2$, $\beta 2$, and $\gamma 2$ may each be independently a positive real number, M2 may include at least one element selected from the group consisting of metallic elements other than Li and metalloid elements, and X2 may include at least one selected from the group consisting of F, Cl, Br, and I. The positive-electrode material containing the second solid electrolyte represented by Composition formula (3) enables improvement in power characteristics of a battery.

For an 11th aspect according to the present disclosure, for example, in the positive-electrode material according to the 10th aspect, M2 may include yttrium. Such a feature enables improvement in charge-discharge characteristics of a battery.

For a 12th aspect according to the present disclosure, for example, in the positive-electrode material according to the 10th or 11th aspect, Composition formula (3) above may satisfy $2.5 \le \alpha 2 \le 3$, $1 \le \beta 2 \le 1.1$, and $\gamma 2 = 6$. Such a feature enables further improvement in the charge-discharge characteristics of a battery.

For a 13th aspect according to the present disclosure, for example, in the positive-electrode material according to any one of the 10th to 12th aspects, X2 may include at least one selected from the group consisting of Cl and Br. Such a feature enables further improvement in the charge-discharge characteristics of a battery.

For a 14th aspect according to the present disclosure, for example, in the positive-electrode material according to any one of the 10th to 13th aspects, the second solid electrolyte may contain $Li_3YBr_2Cl_4$. Such a feature enables further improvement in the charge-discharge characteristics of a battery.

For a 15th aspect according to the present disclosure, for example, in the positive-electrode material according to the 9th aspect, the second solid electrolyte may contain a sulfide solid electrolyte. Such a feature enables further improvement in the charge-discharge characteristics of a battery.

A battery according to a 16th aspect of the present disclosure, including:

a positive electrode containing the positive-electrode material according to any one of the 10th to 15th aspects;

a negative electrode; and an electrolyte layer disposed between the positive electrode and the negative electrode.

Such features enable an increase in the charge-discharge efficiency of the battery.

Hereinafter, embodiments according to the present disclosure will be described with reference to the drawings.

Embodiment 1

FIG. 1 is a sectional view illustrating the schematic configuration of a positive-electrode material 1000 according to Embodiment 1.

The positive-electrode material 1000 according to Embodiment 1 includes a coated active material 130. The coated active material 130 includes a positive-electrode active material 110 and a coating layer 111. The positive-electrode active material 110 has a form, for example, a particulate form. The coating layer 111 covers at least partially the surface of the positive-electrode active material 110.

The coating layer 111 is a layer containing the first solid electrolyte. On the surface of the positive-electrode active material 110, the coating layer 111 is disposed. The coating layer 111 may contain the first solid electrolyte alone. The phrase "contains the first solid electrolyte alone" means that, except for inevitable impurities, materials other than the first solid electrolyte are not intentionally added. For example, raw materials of the first solid electrolyte, by-products generated during preparation of the first solid electrolyte, and the like are included in the inevitable impurities.

The positive-electrode material 1000 further includes a second solid electrolyte 100. The second solid electrolyte 100 has a form, for example, a particulate form. The second solid electrolyte 100 enables sufficient ensuring of ion conductivity in the positive-electrode material 1000.

The positive-electrode active material 110 is separated, by the coating layer 111, from the second solid electrolyte 100. The positive-electrode active material 110 may not be in direct contact with the second solid electrolyte 100. This is because the coating layer 111 has ion conductivity.

The coating layer 111 may uniformly cover the positive-electrode active material 110. The coating layer 111 suppresses direct contact between the positive-electrode active material 110 and the second solid electrolyte 100, to suppress the side reaction of the second solid electrolyte 100. This results in an increase in the charge-discharge efficiency of a battery and enables suppression of an increase in the reaction overvoltage of the battery.

The coating layer 111 may cover only a portion of the surface of the positive-electrode active material 110. Particles of the positive-electrode active material 110 are directly in contact with each other via portions not coated with the coating layer 111, to increase the electron conductivity of particles of the positive-electrode active material 110. This enables a battery to operate at a high power.

Coating, with the coating layer 111, of the positive-electrode active material 110 suppresses, during charging of the battery, formation of oxide films due to oxidation-decomposition of another solid electrolyte (for example, the second solid electrolyte 100). This results in an increase in the charge-discharge efficiency of the battery.

The coating layer **11*l*** may have a thickness of, for example, greater than or equal to 1 nm and less than or equal to 500 nm.

When the coating layer 111 has a thickness of greater than or equal to 1 nm, contact between the positive-electrode active material 110 and the second solid electrolyte 100 is suppressed, and the side reaction of the second solid electrolyte 100 can be suppressed. This enables an increase in the charge-discharge efficiency of a battery.

When the coating layer 111 has a thickness of less than or equal to 500 nm, the internal resistance of the battery due to the thickness of the coating layer 111 can be made to be sufficiently low. This enables an increase in the energy density of the battery.

The method of measuring the thickness of the coating layer 111 is not particularly limited. For example, a transmission electron microscope can be used to perform direct observation to determine the thickness of the first solid electrolyte. Alternatively, Ar sputtering can be performed to etch the coating layer 111 during which XPS is measured to determine, on the basis of changes in the spectrum derived from the active material, the thickness of the coating layer 111.

The positive-electrode active material 110, the coating layer 111, and the second solid electrolyte 100 will be described further in detail.

Coating Layer 111

The first solid electrolyte contained in the coating layer 111 is a halide solid electrolyte.

The halide solid electrolyte has high ion conductivity and high high-potential stability. Furthermore, the halide solid electrolyte has low electron conductivity and high oxidation resistance, and hence is less likely to undergo oxidation-decomposition due to contact with the positive-electrode active material. Thus, use of the halide solid electrolyte enables a further increase in the charge-discharge efficiency of a battery and further suppression of the increase in the reaction overvoltage of the battery.

The halide solid electrolyte is represented by, for example, Composition formula (1) below.

$$Li_{\alpha 1}M1_{\beta 1}X1_{\gamma 1} \quad \text{Formula (1)}$$

In Composition formula (1), $\alpha 1$, $\beta 1$, and $\gamma 1$ are each independently a positive real number. M1 includes calcium, yttrium, and at least one rare-earth element other than yttrium. X1 includes at least one selected from the group consisting of F, Cl, Br, and I.

The halide solid electrolyte represented by Composition formula (1) has a higher ion conductivity than halide solid electrolytes composed of Li and a halogen element such as LiI. Thus, use of the halide solid electrolyte represented by Composition formula (1) for a battery enables improvement in power characteristics of the battery.

In Composition formula (1), in M1, the at least one rare-earth element other than yttrium is at least one selected from the group consisting of Sc, La, Ce, Pr, Nd, Pm, Sm, Eu, Gd, Tb, Dy, Ho, Er, Tm, Yb, and Lu. The rare-earth elements share similar chemical properties and hence can each be used as a constituent element of the halide solid electrolyte according to this embodiment. In Composition formula (1), M1 may include at least one selected from the group consisting of gadolinium and samarium. In Composition formula (1), M1 may include only one selected from the group consisting of gadolinium and samarium.

In Composition formula (1), M1 may include calcium, yttrium, and a single rare-earth element other than yttrium. In other words, M1 may include only a single rare-earth element other than yttrium.

The first solid electrolyte may be represented by the following Composition formula (2).

$$Li_{6-2a-3d}Ca_a(Y_{1-b}Gd_b)_dBr_{6-c}Cl_c \quad \text{Formula (2)}$$

Composition formula (2) satisfies $0<a$, $0<b<1$, $0<c<6$, and $0<d<1.5$.

Such a feature enables a further increase in the ion conductivity of the first solid electrolyte. This enables a further increase in the charge-discharge efficiency of a battery.

Composition formula (2) may satisfy $0.01 \le a \le 0.3$.

Such a feature enables a further increase in the ion conductivity of the first solid electrolyte. This enables a further increase in the charge-discharge efficiency of a battery.

Composition formula (2) may satisfy $a \le 0.2$.

Such a feature enables a further increase in the ion conductivity of the first solid electrolyte. This enables a further increase in the charge-discharge efficiency of a battery.

Composition formula (2) may satisfy $0.1 \le b \le 0.9$.

Such a feature enables a further increase in the ion conductivity of the first solid electrolyte. This enables a further increase in the charge-discharge efficiency of a battery.

Composition formula (2) may satisfy $0.8 \le b<1$.

Such a feature enables a further increase in the ion conductivity of the first solid electrolyte. This enables a further increase in the charge-discharge efficiency of a battery.

Composition formula (2) above may satisfy $1.0 \le c \le 1.2$.

Such a feature enables a further increase in the ion conductivity of the first solid electrolyte. This enables a further increase in the charge-discharge efficiency of a battery.

Note that the first solid electrolyte and the halide solid electrolyte do not necessarily contain sulfur.

Second Solid Electrolyte

The second solid electrolyte 100 contains a material having a high ion conductivity. A s the second solid electrolyte 100, a compound represented by Composition formula (3) below can be used.

$$Li_{\alpha 2}M2_{\beta 2}X2_{\gamma 2} \quad \text{Formula (3)}$$

In Composition formula (3), α2, β2, and γ2 are each independently a positive real number. M2 includes at least one element selected from the group consisting of metallic elements other than Li and metalloid elements. X2 includes at least one selected from the group consisting of F, Cl, Br, and I.

The term "metalloid elements" includes B, Si, Ge, As, Sb, and Te.

The term "metallic elements" includes, in the periodic table, all the elements included in group 1 through group 12 except for hydrogen, and all the elements included in group 13 through group 16 except for B, Si, Ge, As, Sb, Te, C, N, P, O, S, and Se. In other words, the metallic elements are a group of elements that can be turned into cations in the case of forming inorganic compounds with halogen compounds.

Such a feature enables a further increase in the ion conductivity of the second solid electrolyte 100. This enables further improvement in the charge-discharge characteristics of a battery.

In Composition formula (3), M2 may include yttrium. Thus, the second solid electrolyte 100 may include, as a metallic element, Y.

Such a feature enables a further increase in the ion conductivity of the second solid electrolyte 100. This enables further improvement in the charge-discharge characteristics of a battery.

Composition formula (3) may satisfy $2.5 \leq \alpha 2 \leq 3$, $1 \leq \beta 2 \leq 1.1$, and $\gamma 2 = 6$.

Such a feature enables a further increase in the ion conductivity of the second solid electrolyte 100. This enables further improvement in the charge-discharge characteristics of a battery.

In Composition formula (3), X2 may include at least one selected from the group consisting of Cl and Br. X2 may include Cl and Br.

Such a feature enables a further increase in the ion conductivity of the second solid electrolyte 100. This enables further improvement in the charge-discharge characteristics of a battery.

The second solid electrolyte 100 may be a compound represented by Composition formula (A1) below.

$$Li_{6-3d}Y_dX_6 \quad \text{Formula (A)}$$

In Composition formula (A1), X includes at least one selected from the group consisting of F, Cl, Br, and I. In Composition formula (A1), a relation of $0<d<2$ is satisfied.

Such a feature enables a further increase in the ion conductivity of the second solid electrolyte 100. This enables a further increase in the charge-discharge efficiency of a battery.

The second solid electrolyte 100 may be a compound represented by Composition formula (A2) below.

$$Li_3YX_6 \quad \text{Formula (A2)}$$

In Composition formula (A2), X includes at least one selected from the group consisting of F, Cl, Br, and I.

Such a feature enables a further increase in the ion conductivity of the second solid electrolyte 100. This enables a further increase in the charge-discharge efficiency of a battery.

The second solid electrolyte 100 may be a compound represented by Composition formula (A3) below.

$$Li_{3-3\delta+a}Y_{14\delta-a}Me_aCl_{6-x-y}Br_xI_y \quad \text{Formula (A3)}$$

In Composition formula (A3), Me is at least one element selected from the group consisting of Mg, Ca, Sr, Ba, and Zn.

Composition formula (A3) satisfies $-1<\delta<2$, $0<a<3$, $0<(3-3\delta+a)$, $0<(1+\delta-a)$, $0 \leq x<6$, $0<y \leq 6$, and $(x+y)<6$.

Such a feature enables a further increase in the ion conductivity of the second solid electrolyte 100. This enables a further increase in the charge-discharge efficiency of a battery.

The second solid electrolyte 100 may be a compound represented by Composition formula (A4) below.

$$Li_{3-3\delta-a}Y_{1+\delta-a}Me_aCl_{6-x-y}Br_xI_y \quad \text{Formula (A4)}$$

In Composition formula (A4), Me is at least one element selected from the group consisting of Al, Sc, Ga, and Bi.

Composition formula (A4) satisfies $-1<\delta<1$, $0<a<2$, $0<(1+\delta-a)$, $0 \leq x<6$, $0<y \leq 6$, and $(x+y)<6$.

Such a feature enables a further increase in the ion conductivity of the second solid electrolyte 100. This enables a further increase in the charge-discharge efficiency of a battery.

The second solid electrolyte 100 may be a compound represented by Composition formula (A5) below.

$$Li_{3-3\delta-a}Y_{1+\delta-a}Me_aCl_{6-x-y}Br_xI_y \quad \text{Formula (A5)}$$

In Composition formula (A5), Me is at least one element selected from the group consisting of Zr, Hf, and Ti.

Composition formula (A5) satisfies $-1<\delta<1$, $0<a<1.5$, $0<(3-3\delta-a)$, $0<(1+\delta-a)$, $0 \leq x<6$, $0<y \leq 6$, and $(x+y)<6$.

Such a feature enables a further increase in the ion conductivity of the second solid electrolyte 100. This enables a further increase in the charge-discharge efficiency of a battery.

The second solid electrolyte 100 may be a compound represented by Composition formula (A6) below.

$$Li_{3-3\delta-2a}Y_{1+\delta-a}Me_aCl_{6-x-y}Br_xI_y \quad \text{Formula (A6)}$$

In Composition formula (A6), Me is at least one element selected from the group consisting of Ta and Nb.

Composition formula (A6) satisfies the following seven relations: $-1<\delta<1$, $0<a<1.2$, $0<(3-3\delta-2a)$, $0<(1+\delta-a)$, $0 \leq x<6$, $0<y \leq 6$, and $(x+y)<6$.

Such a feature enables a further increase in the ion conductivity of the second solid electrolyte 100. This enables a further increase in the charge-discharge efficiency of a battery.

Note that the second solid electrolyte 100 does not necessarily contain sulfur.

As the second solid electrolyte 100, for example, $Li_3YX_6$, $Li_2MgX_4$, $Li_2FeX_4$, Li(Al, Ga, In)$X_4$, or $Li_3$(Al, Ga, In)$X_6$ can be employed where X includes at least one element selected from the group consisting of Cl and Br, and I.

In the present disclosure, "(A, B, C)" described in chemical formulas means "at least one selected from the group consisting of A, B, and C". For example, "(Al, Ga, In)" has the same definition as "at least one selected from the group consisting of Al, Ga, and In".

The representative composition of $Li_3YX_6$ is, for example, $LiYBr_2CL$. The second solid electrolyte 100 may contain $Li_3YBr_2Cl_4$.

Such a feature enables a further increase in the ion conductivity of the second solid electrolyte 100. This enables further improvement in the charge-discharge characteristics of a battery.

The second solid electrolyte 100 may contain a sulfide solid electrolyte. As the sulfide solid electrolyte, for example, $Li_2S—P_2S_5$, $Li_2S—SiS_2$, $Li_2S—B_2S_3$, $Li_2S—GeS_2$, $Li_{3.25}Ge_{0.25}P_{0.75}S_4$, or $Li_{10}GeP_2S_{12}$ can be employed. To this, for example, LiX, $Li_2O$, $MO_q$, or $Li_pMO_q$ may be added. In "LiX", the element X is at least one element selected from the group consisting of F, Cl, Br, and I. In "$MO_q$" and "$Li_pMO_q$", the element M is at least one element selected from the group consisting of P, Si, Ge, B, Al, Ga, In, Fe, and Zn. In "$MO_q$" and "$Li_pMO_q$", p and q are each independently a natural number.

In Embodiment 1, the second solid electrolyte 100 may be a sulfide solid electrolyte. For example, the sulfide solid electrolyte may contain lithium sulfide and phosphorus sulfide. The sulfide solid electrolyte may be $Li_2S—P_2S_5$.

$Li_2S—P_2S_5$ has a high ion conductivity and has stability for oxidation and reduction. Thus, use of $Li_2S—P_2S_5$ enables a further increase in the charge-discharge efficiency of a battery.

The second solid electrolyte 100 may be a mixture of two or more selected from the group consisting of a halide solid electrolyte, a sulfide solid electrolyte, an oxide solid electrolyte, a polymer solid electrolyte, and a complex hydride solid electrolyte. For example, the second solid electrolyte 100 may be a mixture of a halide solid electrolyte and a sulfide solid electrolyte.

Positive-Electrode Active Material

The positive-electrode active material 110 contains a material that has a property of occluding and releasing metallic ions (for example, lithium ions). As the positive-electrode active material 110, for example, a lithium-containing transition metal oxide (for example, $Li(NiCoAl)O_2$, $Li(NiCoMn)O_2$, or $LiCoO_2$), a transition metal fluoride, a polyanion material, a fluorinated polyanion material, a transition metal sulfide, a transition metal oxysulfide, or a transition metal oxynitride may be employed. In particular, in the case of employing, as the positive-electrode active material 110, a lithium-containing transition metal oxide, the production costs can be reduced and the average discharge voltage can be increased.

In Embodiment 1, the positive-electrode active material 110 may contain Ni, Co, and Mn. The positive-electrode active material 110 may be lithium nickel cobalt manganese oxide (namely, NMC). For example, the positive-electrode active material 110 may be $Li(NiCoMn)O_2$.

Such a feature enables a further increase in the energy density and the charge-discharge efficiency of a battery.

In Embodiment 1, the form of the second solid electrolyte 100 is not particularly limited and may be, for example, acicular, spherical, or ellipsoidal. For example, the second solid electrolyte 100 may have a particulate form.

For example, in Embodiment 1, when the second solid electrolyte 100 has a particulate (for example, spherical) form, the median size may be less than or equal to 100 μm. When the median size is less than or equal to 100 μm, the coated active material 130 and the second solid electrolyte 100 can have a good dispersion state in the positive-electrode material 1000. This results in improvement in the charge-discharge characteristics of a battery. In Embodiment 1, the second solid electrolyte 100 may have a median size of less than or equal to 10 μm.

Such a feature enables, in the positive-electrode material 1000, a good dispersion state of the coated active material 130 and the second solid electrolyte 100.

In Embodiment 1, the second solid electrolyte 100 may have a median size smaller than the median size of the coated active material 130.

Such a feature enables, in the positive-electrode material 1000, a better dispersion state of the second solid electrolyte 100 and the coated active material 130.

The coated active material 130 may have a median size of greater than or equal to 0.1 μm and less than or equal to 100 μm.

When the coated active material 130 has a median size of greater than or equal to 0.1 μm, in the positive-electrode material 1000, a good dispersion state of the coated active material 130 and the second solid electrolyte 100 can be provided. This results in improvement in the charge-discharge characteristics of a battery.

When the coated active material 130 has a median size of less than or equal to 100 μm, the diffusion rate of lithium within the coated active material 130 is sufficiently ensured. This enables a battery to operate at a high power.

The coated active material 130 may have a median size larger the median size of the second solid electrolyte 100. This results in a good dispersion state of the coated active material 130 and the second solid electrolyte 100.

The term "median size" means a particle size where the cumulative volume in the volume-based particle size distribution is equal to 50%. The volume-based particle size distribution is measured using, for example, a laser diffraction measurement apparatus or an image analysis apparatus.

On the surface of the positive-electrode active material 110, a Li—Nb—O compound such as $LiNbO_3$, a Li—B—O compound such as $LiBO_2$ or $Li_3BO_3$, a Li—Al—O) compound such as $LiAlO_2$, a Li—Si—O compound such as $Li_4SiO_4$, $Li_2SO_4$, a Li—Ti—O compound such as $Li_4Ti_5O_{12}$, a Li—Zr—O compound such as $Li_2ZrO_3$, a Li—Mo—O compound such as $Li_2MoO_3$, a Li-V-O compound such as $LiV_2O_5$, a Li—W—O compound such as $Li_2WO_4$, or a Li—P—O compound such as $Li_3PO_4$ may be further disposed.

Such a feature enables, in the positive electrode, suppression of oxidation of the first solid electrolyte.

In Embodiment 1, in the positive-electrode material 1000, the second solid electrolyte 100 and the coated active material 130 may be in contact with each other as illustrated in FIG. 1. In this case, the coating layer 111 and the positive-electrode active material 110 are in contact with each other.

In Embodiment 1, the positive-electrode material 1000 may contain particles of a plurality of second solid electrolytes 100 and particles of a plurality of coated active materials 130.

In Embodiment 1, in the positive-electrode material 1000, the content of the second solid electrolyte 100 and the content of the coated active material 130 may be the same or different.

Method for Producing First Solid Electrolyte and Second Solid Electrolyte

The first solid electrolyte and the second solid electrolyte 100 contained in the coating layer 11I can be produced by, for example, the following method.

Raw material powders are prepared in a mixing ratio of the target composition and mixed together. Examples of the raw material powders include oxide, hydroxide, halide, and acid halide. For example, in the case of producing $Li_3YCl_6$, LiCl and $YCl_3$ are prepared in a molar ratio of 3:1.

In this case, the types of the raw material powders can be selected so as to determine, in the above-described composition formula representing the first solid electrolyte, "M1" and "X1". In addition, the raw materials, the mixing ratio, and the synthesis process can be adjusted so as to adjust, in the above-described composition formula representing the first solid electrolyte, values of "α1", "β1", "γ1", "a", "b", "c", and "d". The types of the raw material powders can be selected so as to determine, in the above-described composition formula representing the second solid electrolyte, "M2", "Me", "X2", and "X". The raw materials, the mixing ratio, and the synthesis process can be adjusted so as to adjust, in the above-described composition formula representing the second solid electrolyte, the values of "α2", "β2", "γ2", "d", "a", "x", and "y".

The raw material powders are sufficiently mixed and subsequently a mechanochemical milling method is used to mix together, grind, and react the raw material powders. Alternatively, the raw material powders may be sufficiently mixed and subsequently sintered in vacuum.

This provides the first solid electrolyte and the second solid electrolyte 100.

In such a solid electrolyte, the configuration of the crystal phase (namely, crystal structure) can be determined by adjusting the process of reaction between the raw material powders and the reaction conditions.

Method for Producing Coated Active Material

The coated active material 130 can be produced by, for example, the following method.

The powder of the positive-electrode active material 110 and the powder of the first solid electrolyte are mixed together in an appropriate ratio to obtain a mixture. The mixture is subjected to a milling treatment to apply mechanical energy to the mixture. For the milling treatment, a mixing apparatus such as a ball mill can be used. In order to suppress oxidation of the materials, the milling treatment may be performed in a dry atmosphere and inert atmosphere.

The coated active material 130 may be produced by a dry particle composing method. The treatment by the dry particle composing method includes applying at least one mechanical energy selected from the group consisting of impact, compression, and shearing to the positive-electrode active material 110 and the first solid electrolyte. The positive-electrode active material 110 and the first solid electrolyte are mixed together in an appropriate ratio.

The apparatus used in the method for producing the coated active material 130 is not particularly limited, and can be an apparatus that applies mechanical energy such as impact, compression, and shearing to the mixture of the positive-electrode active material 110 and the first solid electrolyte. Examples of the apparatus that applies mechanical energy include compression-shearing processing apparatuses (particle composing apparatuses) such as ball mills, "MECHANO FUSION" (manufactured by Hosokawa Micron Corporation), and "NOBILTA" (manufactured by Hosokawa Micron Corporation).

"MECHANO FUSION" is a particle composing apparatus using the dry mechanical composing technology of applying strong mechanical energy to a plurality of different material particles. In MECHANO FUSION, to the powder raw materials fed between the rotating vessel and the press head, mechanical energy such as compression, shearing, and friction is applied, to thereby compose the particles.

"NOBILTA" is a particle composing apparatus using the dry mechanical composing technology developed, in order to compose nanoparticles serving as raw materials, from the particle composing technology. NOBILTA applies, to a plurality of raw material powders, mechanical energy of impact, compression, and shearing to thereby produce composite particles.

In "NOBILTA", within a horizontal cylindrical mixing vessel, a treatment of rotating, at a high speed, a rotor disposed so as to have a predetermined gap to the inner wall of the mixing vessel, to forcibly pass the raw material powders through the gap is repeated a plurality of times. This exerts, to the mixture, impact, compression, and shear forces, to produce composite particles of the positive-electrode active material 110 and the first solid electrolyte. Conditions such as the rotation speed of the rotor, the treatment time, and the charge amounts can be appropriately adjusted.

Method for Producing Positive-Electrode Material

The coated active material 130 and the second solid electrolyte 100 are mixed together to thereby obtain the positive-electrode material 1000. The method of mixing together the coated active material 130 and the second solid electrolyte 100 is not particularly limited. For example, an instrument such as a mortar may be used to mix together the coated active material 130 and the second solid electrolyte 100, or a mixing apparatus such as a ball mill may be used to mix together the coated active material 130 and the second solid electrolyte 100. The mixing ratio of the coated active material 130 to the second solid electrolyte 100 is not particularly limited.

Embodiment 2

Hereinafter, Embodiment 2 will be described. The same descriptions as in Embodiment 1 will be appropriately omitted.

Figure 2:
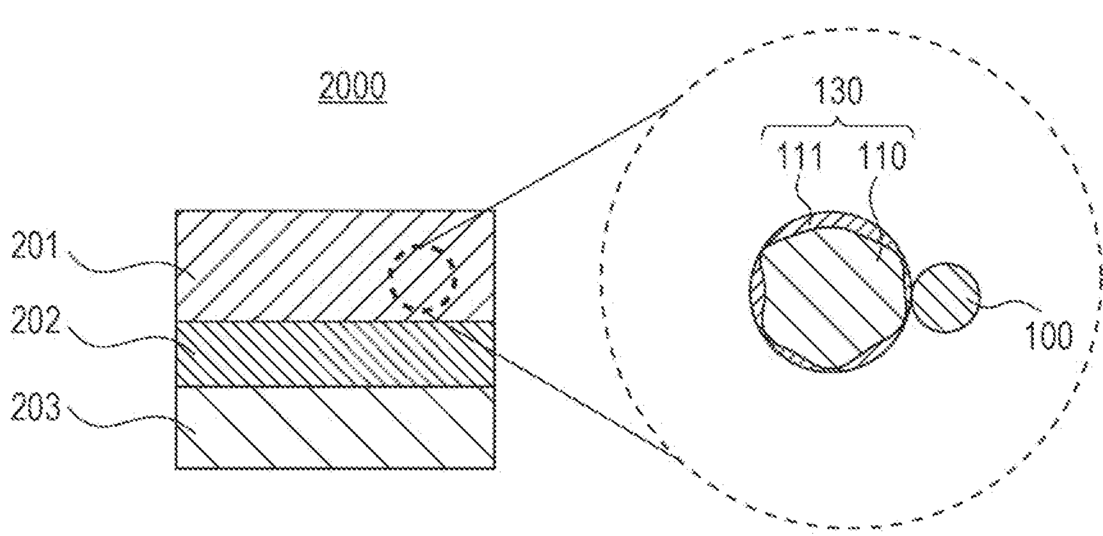
FIG. 2 is a sectional view illustrating the schematic configuration of a battery according to Embodiment 2.

FIG. 2 is a sectional view illustrating the schematic configuration of a battery 2000 according to Embodiment 2.

In Embodiment 2, the battery 2000 includes a positive electrode 201, an electrolyte layer 202, and a negative electrode 203.

The positive electrode 201 includes the positive-electrode material 1000 according to Embodiment 1.

The electrolyte layer 202 is disposed between the positive electrode 201 and the negative electrode 203.

Such features enable an increase in the charge-discharge efficiency of the battery 2000.

In the positive electrode 201, for a volume ratio "v1:100-v1" of the positive-electrode active material 110 to the second solid electrolyte 100, $30 \leq v1 \leq 95$ may be satisfied. When $30 \leq v1$ is satisfied, the energy density of the battery 2000 tends to be sufficiently ensured. When $v1 \leq 95$ is satisfied, operation of the battery 2000 at a high power is facilitated.

The positive electrode 201 may have a thickness of greater than or equal to 10 μm and less than or equal to 500 μm. When the positive electrode 201 has a thickness of greater than or equal to 10 μm, the energy density of the battery 2000 is sufficiently ensured. When the positive electrode 201 has a thickness of less than or equal to 500 μm, operation at a high power can be provided.

The electrolyte layer 202 is a layer containing an electrolyte. The electrolyte is, for example, a solid electrolyte. The solid electrolyte contained in the electrolyte layer 202 is referred to as a third solid electrolyte. Thus, the electrolyte layer 202 may include a third solid electrolyte layer.

As the third solid electrolyte, a halide solid electrolyte, a sulfide solid electrolyte, an oxide solid electrolyte, a polymer solid electrolyte, or a complex hydride solid electrolyte may be employed.

When the third solid electrolyte is a halide solid electrolyte, as the halide solid electrolyte, the same halide solid electrolyte as the first solid electrolyte and/or the second solid electrolyte in Embodiment 1 may be employed. Thus, the electrolyte layer 202 may contain a halide solid electrolyte having the same composition as the composition of the first solid electrolyte and/or the second solid electrolyte.

Such features enable a further increase in the power density and further improvement in the charge-discharge characteristics of the battery 2000.

Alternatively, the third solid electrolyte may be a halide solid electrolyte having a composition different from the compositions of the first solid electrolyte and the second solid electrolyte. Thus, the electrolyte layer 202 may contain a halide solid electrolyte having a composition different from the compositions of the first solid electrolyte and the second solid electrolyte.

Such a feature enables further improvement in the charge-discharge characteristics of the battery.

When the third solid electrolyte is a sulfide solid electrolyte, as the sulfide solid electrolyte, for example, $Li_2S—P_2S_5$, $Li_2S—SiS_2$, $Li_2S—B_2S_3$, $Li_2S—GeS_2$, $Li_{3.25}Ge_{0.25}P_{0.75}S_4$, or $Li_{10}GeP_2S_{12}$ may be employed. To these, for example, LiX, $Li_2O$, $MO_q$, or $Li_pMO_q$ may be added. In "LiX", the element X is at least one element selected from the group consisting of F, Cl, Br, and I. In "$MO_q$" and "$Li_pMO_q$", the element M is at least one element selected from the group consisting of P, Si, Ge, B, Al, Ga, In, Fe, and Zn. In "$MO_q$" and "$Li_pMO_q$", p and q are each independently a natural number.

As the third solid electrolyte, the same sulfide solid electrolyte as the second solid electrolyte in Embodiment 1 may be employed. Thus, the electrolyte layer 202 may contain a sulfide solid electrolyte having the same composition as the composition of the second solid electrolyte in Embodiment 1.

In such a feature, the electrolyte layer 202 contains the sulfide solid electrolyte having high reduction stability, so that a negative electrode material having a low potential such as graphite or metallic lithium can be used, and an increase in the energy density of the battery 2000 can be achieved. The feature in which the electrolyte layer 202 contains the same sulfide solid electrolyte as the second solid electrolyte enables an increase in the charge-discharge efficiency of the battery 2000.

When the third solid electrolyte is an oxide solid electrolyte, examples of the oxide solid electrolyte that can be employed include NASICON-type solid electrolytes represented by $LiTi_2(PO_4)_3$ and its element-substituted forms, $(LaLi)TiO_3$-based perovskite-type solid electrolytes, LISICON-type solid electrolytes represented by $Li_{14}ZnGe_4O_{16}$, $Li_4SiO_4$, $LiGeO_4$, and their element-substituted forms, garnet-type solid electrolytes represented by $Li_7La_3Zr_2O_{12}$ and its element-substituted forms, $Li_3N$ and its H-substituted forms, $Li_3PO_4$ and its N-substituted forms, and glass or glass ceramic provided by adding, to a base material containing a Li—B—O compound such as $LiBO_2$ or $Li_3BO_3$, a material such as $Li_2SO_4$ or $Li_2CO_3$.

When the third solid electrolyte is a polymer solid electrolyte, as the polymer solid electrolyte, for example, a compound derived from a polymer and a lithium salt can be employed. The polymer may have an ethylene oxide structure. The polymer that has an ethylene oxide structure can contain a large amount of lithium salt, to thereby achieve a further increase in the ion conductivity. Examples of the lithium salt that can be employed include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. As the lithium salt, a lithium salt selected from the foregoing may be employed alone, or a mixture of two or more lithium salts selected from the foregoing may be employed.

When the third solid electrolyte is a complex hydride solid electrolyte, as the complex hydride solid electrolyte, for example, $LiBH_4—LiI$ or $LiBH_4—P_2S_5$ can be employed.

The electrolyte layer 202 may contain the third solid electrolyte as the main component. In other words, the electrolyte layer 202 may contain the third solid electrolyte, for example, in a mass ratio of greater than or equal to 50% (thus, greater than or equal to 50 mass %) relative to the entirety of the electrolyte layer 202.

Such a feature enables a further increase in the charge-discharge efficiency of the battery 2000.

The electrolyte layer 202 may contain the third solid electrolyte in a mass ratio of greater than or equal to 70% (thus, greater than or equal to 70 mass %) relative to the entirety of the electrolyte layer 202.

Such a feature enables a further increase in the charge-discharge efficiency of the battery 2000.

The electrolyte layer 202 may contain, in addition to the third solid electrolyte as the main component, for example, inevitable impurities, or starting materials, by-products, and decomposition products during synthesis of the third solid electrolyte.

The electrolyte layer 202 may contain, for example, except for impurities inevitably contained, the third solid electrolyte in a mass ratio of 100% (thus, 100 mass %) relative to the entirety of the electrolyte layer 202.

Such a feature enables a further increase in the charge-discharge efficiency of the battery 2000.

As described above, the electrolyte layer 202 may be composed only of the third solid electrolyte.

The electrolyte layer 202 may contain two or more of the materials described as the third solid electrolytes. For example, the electrolyte layer 202 may contain a halide solid electrolyte and a sulfide solid electrolyte.

The electrolyte layer 202 may have a thickness of greater than or equal to 1 μm and less than or equal to 300 μm. When the electrolyte layer 202 has a thickness of greater than or equal to 1 μm, the positive electrode 201 and the negative electrode 203 can be separated from each other with more certainty. When the electrolyte layer 202 has a thickness of less than or equal to 300 μm, operation at a high power can be provided.

The negative electrode 203 contains a material having a property of occluding and releasing metallic ions (for example, lithium ions). The negative electrode 203 contains, for example, a negative electrode active material.

As the negative electrode active material, for example, a metallic material, a carbon material, an oxide, a nitride, a tin compound, or a silicon compound can be employed. The metallic material may be an elemental metal. Alternatively, the metallic material may be an alloy. Examples of the metallic material include metallic lithium and lithium alloys. Examples of the carbon material include natural graphite, coke, partially graphitized carbon, carbon fiber, spherical carbon, synthetic graphite, and amorphous carbon. From the viewpoint of capacity density, silicon (Si), tin (Sn), a silicon compound, or a tin compound can be employed.

The negative electrode 203 may contain a solid electrolyte. As the solid electrolyte, the solid electrolytes described as examples of the material forming the electrolyte layer 202 may be employed. Such a feature enables an increase in the lithium-ion conductivity within the negative electrode 203, and operation at a high power can be provided.

The particles of the negative electrode active material may have a median size of greater than or equal to 0.1 μm and less than or equal to 100 μm. When the particles of the negative electrode active material have a median size of greater than or equal to 0.1 μm, in the negative electrode, a good dispersion state of the negative electrode active material and the solid electrolyte can be provided. This results in improvement in the charge-discharge characteristics of the battery 2000. When the negative electrode active material has a median size of less than or equal to 100 μm, the rate of lithium diffusion within the negative electrode active material is increased. This results in the battery 2000 that can operate at a high power.

The particles of the negative electrode active material may have a median size larger than the median size of the solid electrolyte contained in the negative electrode 203. This can provide a good dispersion state of the particles of the negative electrode active material and the particles of the solid electrolyte.

For a volume ratio "v2:100-v2" of the negative electrode active material to the solid electrolyte contained in the negative electrode 203, 30≤v2≤95 may be satisfied. In the case of 30≤v2, the energy density of the battery 2000 can be sufficiently ensured. In the case of v2≤95, operation at a high power can be provided.

The negative electrode 203 may have a thickness of greater than or equal to 10 μm and less than or equal to 500 μm. When the negative electrode 203 has a thickness of greater than or equal to 10 μm, the energy density of the battery 2000 can be sufficiently ensured. When the negative electrode 203 has a thickness of less than or equal to 500 μm, operation at a high power can be provided.

At least one of the positive electrode 201, the electrolyte layer 202, and the negative electrode 203 may contain, in order to improve adhesiveness between particles, a binder. The binder is used in order to improve the bindability of the material forming such an electrode. Examples of the binder include polyvinylidene fluoride, polytetrafluoroethylene, polyethylene, polypropylene, aramid resin, polyamide, polyimide, polyamide-imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene-butadiene rubber, and carboxymethylcellulose. The binder may be a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. Alternatively, two or more selected from the foregoing may be mixed together and used as the binder.

At least one of the positive electrode 201 and the negative electrode 203 may contain, in order to increase the electron conductivity, a conductive additive. Examples of the conductive additive that can be employed include graphites such as natural graphite and synthetic graphite, carbon blacks such as acetylene black and Ketjenblack, conductive fibers such as carbon fibers and metallic fibers, fluorocarbon, powders of metals such as aluminum, conductive whiskers of, for example, zinc oxide or potassium titanate, conductive metal oxides such as titanium oxide, and conductive polymers such as polyaniline, polypyrrole, and polythiophene. Use of a carbon conductive additive enables a reduction in the costs.

Note that the battery according to Embodiment 2 can be provided as batteries having various shapes such as a coin type, a cylindrical type, a prismatic type, a sheet type, a button type, a flat type, and a laminate type.

EXAMPLES

Hereinafter, with reference to Examples and Comparative Examples, the present disclosure will be described in detail.

Example 1

Preparation of Second Solid Electrolyte

Within an argon glove box having a dew point of less than or equal to −60° C., LiCl, LiBr, and $YCl_3$ serving as raw material powders were weighed in a molar ratio of LiCi:LiBr:$YC_3$=1:2:1. Subsequently, a planetary ball mill (manufactured by FRITSCH GmbH, model: P-5) was used to subject the resultant mixture to a milling treatment under conditions of 25 hours and 600 rpm. This provided a powder of the second solid electrolyte of Example 1 represented by a composition formula $Li_3Y_1Br_2Cl_4$ (hereafter, referred to as LYBC). The composition of the second solid electrolyte of Example 1 will be described in Table 1.

Evaluation of Ion Conductivity

Figure 3:
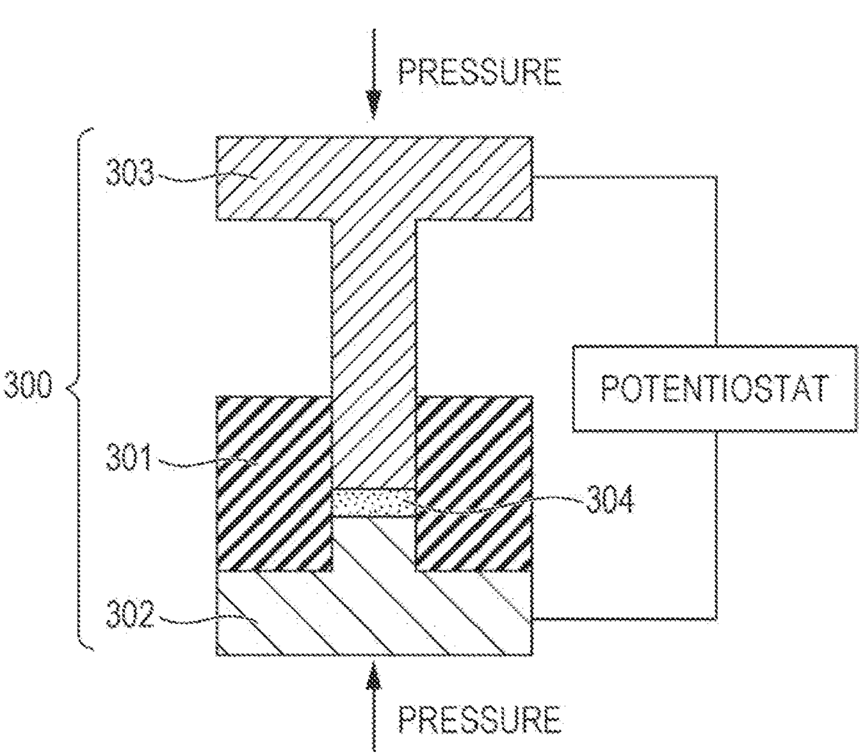
FIG. 3 is a schematic view of a pressure-molding die used for evaluating the ion conductivity of a solid electrolyte.

FIG. 3 is a schematic view of a pressure-molding die 300 used for evaluating the ion conductivity of the solid electrolyte.

The pressure-molding die 300 included a die 301, a lower punch 302, and an upper punch 303. The die 301 was formed of electronically insulating polycarbonate. The lower punch 302 and the upper punch 303 were formed of electron conductive stainless steel.

The pressure-molding die 300 illustrated in FIG. 3 was used to perform the following method to evaluate the ion conductivity of the second solid electrolyte of Example 1.

In a dry atmosphere having a dew point of less than or equal to −30° C., a powder 304 of the second solid electrolyte of Example 1 was filled into the pressure-molding die 300. Within the pressure-molding die 300, the upper punch 303 and the lower punch 302 were used to apply a pressure of 300 MPa to the powder 304 of the second solid electrolyte of Example 1.

Under the application of pressure, the upper punch 303 and the lower punch 302 were connected to a potentiostat equipped with a frequency response analyzer (Princeton Applied Research, VersaSTAT4). The upper punch 303 was connected to a working electrode and a terminal for potential measurement. The lower punch 302 was connected to a counter electrode and a reference electrode. The impedance of the second solid electrolyte was measured by an electrochemical impedance measurement method at room temperature.

Figure 4:
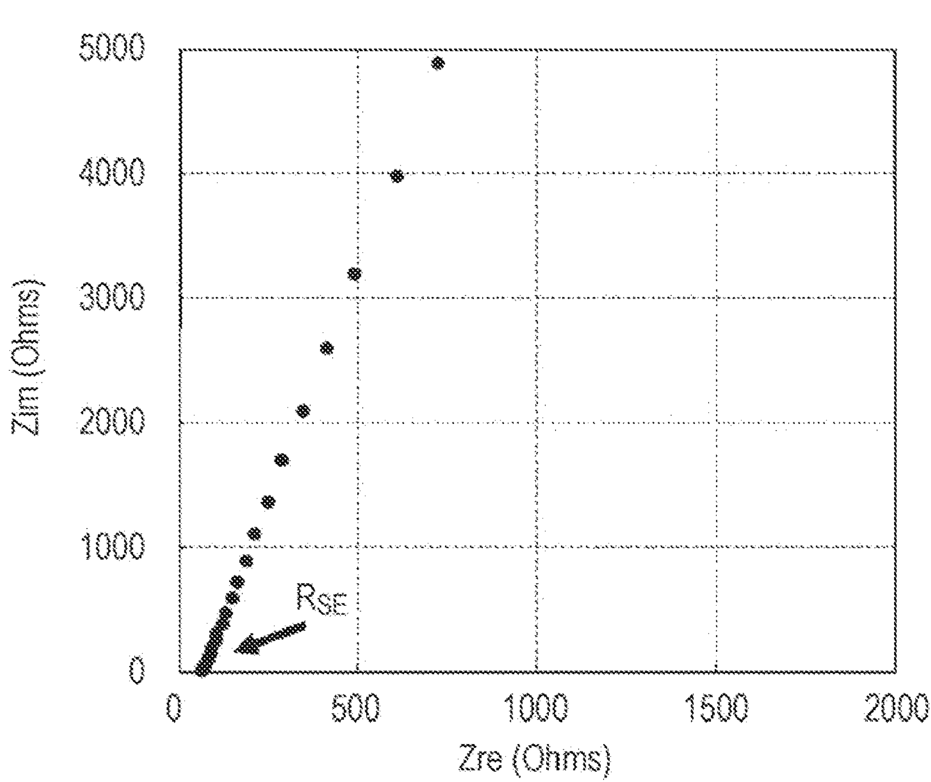
FIG. 4 is a graph illustrating a Cole-Cole plot obtained by an impedance measurement of a second solid electrolyte of Example 1.

FIG. 4 is a graph illustrating the Cole-Cole plot obtained by the impedance measurement of the second solid electrolyte of Example 1.

In FIG. 4, the real number of impedance at a measurement point where the absolute value of the phase of complex impedance was minimum was regarded as the resistance for ion conduction of the second solid electrolyte of Example 1. For the real number, refer to arrow $R_{SE}$ in FIG. 4. The resistance was used to calculate the ion conductivity by the following Mathematical formula (C).

$$\sigma=(R_{SE}\times S/t)^{-1} \quad \text{Formula (C1)}$$

In Mathematical formula (C1), a represents ion conductivity; S represents the area of contact between the second solid electrolyte and the upper punch 303 (in FIG. 3, equal to the cross-sectional area of the hollow region of the die 301); $R_{SE}$ represents the resistance of the second solid electrolyte in the impedance measurement; t represents the thickness of the second solid electrolyte (thus, in FIG. 3, the thickness of the layer formed of the powder 304 of the second solid electrolyte).

The ion conductivity of the second solid electrolyte of Example 1 (namely, LYBC) measured at 22° C. was found to be $1.41\times10^{-3}$ S/cm.

Preparation of First Solid Electrolyte

Within an argon glove box having a dew point of less than or equal to −60° C., LiCl, LiBr. $YCl_3$, $GdCl_3$, and $CaBr_2$ serving as raw material powders were weighed in a molar ratio of LiCl:LiBr:$YCl_3$:$GdCl_3$:$CaBr_2$=1:1.8:0.9:0.1:0.1. These were ground and mixed together in a mortar. Subsequently, a planetary ball mill (manufactured by FRITSCH GmbH, model: P-7) was used to subject the resultant mixture to a milling treatment under conditions of 12 hours and 600 rpm. This provided a powder of the first solid electrolyte of Example 1 represented by a composition formula $Li_{2.8}Ca_{0.1}Y_{0.9}Gd_{0.1}Br_2Cl_4$. The composition of the first solid electrolyte of Example 1 and values corresponding to a, b, c, and d in Composition formula (2) will be described in Table 1.

In the entirety of the first solid electrolyte of Example 1, Li, Ca, Y, and Gd contents per unit mass were measured by ICP emission spectrometry, and the Li, Ca, Y, and Gd contents were converted into a molar ratio. The ratio of Li:Ca:Y:Gd was 2.8:0.1:0.9:0.1. The apparatus used for measuring the composition was an ICP emission spectrometer ("iCAP 7400" (manufactured by Thermo Fisher Scientific Inc.)).

Evaluation of Ion Conductivity

The same method as in the measurement of the ion conductivity of the second solid electrolyte was performed to measure the ion conductivity of the first solid electrolyte. The ion conductivity of the first solid electrolyte of Example 1 measured at 22° C. was found to be $2.10\times10^{-3}$ S/cm.

Preparation of Coated Active Material

As the positive-electrode active material, $Li(NiCoMn)O_2$ (hereafter, referred to as NCM) was used. On NCM, a coating layer formed of $Li_{2.8}Ca_{0.1}Y_{0.9}Gd_{0.1}Br_2Cl_4$ serving as the first solid electrolyte was formed. The coating layer was formed by a compression-shearing treatment using a particle composing apparatus (NOB-MINI, manufactured by Hosokawa Micron Corporation). Specifically, the positive-electrode active material and the first solid electrolyte were weighed in a mass ratio of 95.72:4.28, and treated under conditions of a blade clearance of 2 mm and a treatment time of 50 min, to form a coating layer formed of the first solid electrolyte on the surface of a particle of the positive-electrode active material. In this way, the coated active material of Example 1 was obtained.

Preparation of Positive-Electrode Material

Within an argon glove box, the positive-electrode active material of the coated active material of Example 1 and the sum of the first solid electrolyte of Example 1 and the second solid electrolyte of Example 1 were weighed in a volume ratio of positive-electrode active material:first solid electrolyte+second solid electrolyte=73:27. These were mixed together in an agate mortar, to thereby prepare the positive-electrode material of Example 1.

Example 2

A s raw material powders, LiCi, LiBr, $YCl_3$, $GdCl_3$, and $CaBr_2$ were weighed to prepare the first solid electrolyte of Example 2 represented by a composition formula $Li_{2.8}Ca_{0.1}Y_{0.6}Gd_{0.4}Br_2Cl_4$. The composition of the first solid electrolyte of Example 2 and the values corresponding to a, b, c, and d in Composition formula (2) will be described in Table 1. The same method as in Example 1 above was performed except that the first solid electrolyte represented by the composition formula was used for the coating layer, to obtain a positive-electrode material of Example 2. The same method as in the measurement of the ion conductivity of the second solid electrolyte of Example 1 was performed to measure the ion conductivity of the first solid electrolyte of Example 2. The ion conductivity of the first solid electrolyte of Example 2 measured at 22° C. was found to be $2.51\times10^{-3}$S/cm.

Example 3

As raw material powders, LiCl, LiBr, $YCl_3$, $GdCl_3$, and $CaBr_2$ were weighed to prepare a first solid electrolyte of Example 3 represented by a composition formula $Li_{2.8}Ca_{0.1}Y_{0.1}Gd_{0.9}Br_2Cl_4$. The composition of the first solid electrolyte of Example 3 and values corresponding to a, b, c, and d in Composition formula (2) will be described in Table 1. The same method as in Example 1 above was performed except that the first solid electrolyte represented by the composition formula was used for the coating layer, to obtain a positive-electrode material of Example 3. The same method as in the measurement of the ion conductivity of the second solid electrolyte of Example 1 was performed to measure the ion conductivity of the first solid electrolyte of Example 3. The ion conductivity of the first solid electrolyte of Example 3 measured at 22° C. was found to be $2.24\times10^{-3}$ S/cm.

Example 4

Preparation of Sulfide Solid Electrolyte

Within an argon glove box having a dew point of less than or equal to −60° C., $Li_2S$ and $P_2S_5$ serving as raw material powders were weighed in a molar ratio of $Li_2S$:$P_2S_5$=75:25. These were ground and mixed together using a mortar to obtain a mixture. Subsequently, a planetary ball mill (manufactured by FRITSCH GmbH, model: P-7) was used to subject the mixture to a milling treatment under conditions of 10 hours and 510 rpm. This provided a glass-form solid electrolyte. The glass-form solid electrolyte was heat-treated in an inert atmosphere under conditions of 270° C. and 2 hours. This provided, as the second solid electrolyte of Example 4, a glass-ceramic-form solid electrolyte $Li_2S$—$P_2S_5$ (hereafter, referred to as LPS).

Evaluation of Ion Conductivity

The same method as in the measurement of the ion conductivity of the second solid electrolyte of Example 1 was performed to measure the ion conductivity of the second solid electrolyte of Example 4. The ion conductivity of the second solid electrolyte of Example 4 measured at 22° C. was found to be $0.60\times10^{-3}$S/cm.

Preparation of Positive-Electrode Material

Within an argon glove box, the positive-electrode active material of the coated active material of Example 2 and the sum of the first solid electrolyte of Example 2 and the second solid electrolyte of Example 4 were weighed in a volume ratio of positive-electrode active material:first solid electrolyte+second solid electrolyte=50:50. These were mixed together using an agate mortar, to thereby prepare the positive-electrode material of Example 4.

Comparative Example 1

The positive-electrode material of Comparative Example 1 was obtained by the same method as in Example 1 except that the coating layer was not prepared and NCM not having a coating layer was used as the positive-electrode active material.

Comparative Example 2

The positive-electrode material of Comparative Example 2 was obtained by the same method as in Example 4 except that the coating layer was not prepared and NCM not having a coating layer was used as the positive-electrode active material.

Production of Battery

The above-described positive-electrode materials of Examples 1 to 4 and Comparative Examples 1 and 2 and LYBC and glass-ceramic-form LPS were used to perform the following steps.

First, within an insulating outer cylinder, 60 mg of LPS, 20 mg of LYBC, and such a positive-electrode material were sequentially stacked. At this time, for the mass of the positive-electrode material, it was weighed such that the mass of the positive-electrode active material became 14 mg. This was pressure-molded at a pressure of 720 MPa to obtain a positive electrode and a solid electrolyte layer.

Subsequently, on a side of the solid electrolyte layer opposite from the side in contact with the positive electrode, a metallic Li layer (thickness: 200 μm) was formed. The resultant stack was pressure-molded at a pressure of 80 MPa to thereby produce a stack composed of the positive electrode, the solid electrolyte layer, and a negative electrode.

Subsequently, over and under the stack, stainless steel current collectors were disposed. To each of the current collectors, a current collection lead was connected.

Finally, an insulating ferrule was used to seal the insulating outer cylinder to thereby shut off the interior of the outer cylinder from the outside atmosphere, to produce a battery.

In this way, batteries of Examples 1 to 4 and Comparative Examples 1 and 2 above were produced.

Charging Test

The batteries of Examples 1 to 4 and Comparative Examples 1 and 2 above were each subjected to a charging test under the following conditions.

Such a battery was disposed in a thermostat at 25° C.

The battery was subjected to constant-current charging at a current of 140 μA, which corresponds to 0.05 C-rate (20 hour-rate) relative to the theoretical capacity, until the voltage reached 4.3 V. After an interval for 20 min elapsed, the battery was subjected to constant-current discharging at a current of 140 μA, which corresponds to 0.05 C-rate (20 hour-rate), until the voltage reached 2.5 V, and subjected to an interval for 20 min.

The ratio of the discharge capacity determined above to the charge capacity determined above was calculated as charge-discharge efficiency. The results will be described in Table 1.

TABLE 1

| | First solid electrolyte | Second solid electrolyte | a | b | c | d | Charge-discharge efficiency |
|---|---|---|---|---|---|---|---|
| Example 1 | $Li_{2.8}Ca_{0.1}Y_{0.9}Gd_{0.1}Br_2Cl_4$ | LYBC | 0.1 | 0.1 | 4 | 1 | 90% |
| Example 2 | $Li_{2.8}Ca_{0.1}Y_{0.6}Gd_{0.4}Br_2Cl_4$ | LYBC | 0.1 | 0.4 | 4 | 1 | 90% |
| Example 3 | $Li_{2.8}Ca_{0.1}Y_{0.1}Gd_{0.9}Br_2Cl_4$ | LYBC | 0.1 | 0.9 | 4 | 1 | 88% |
| Example 4 | $Li_{2.8}Ca_{0.1}Y_{0.6}Gd_{0.4}Br_2Cl_4$ | LPS | 0.1 | 0.4 | 4 | 1 | 76% |
| Comparative Example 1 | — | LYBC | — | — | — | — | 87% |
| Comparative Example 2 | — | LPS | — | — | — | — | 59% |

DISCUSSION

The results of Examples 1 to 3 and Comparative Example 1 in Table 1 have demonstrated the following. In the case of using, as the second solid electrolyte, a halide solid electrolyte, use of a positive-electrode material in which the surface of the positive-electrode active material was coated with a halide solid electrolyte having a higher conductivity than the second solid electrolyte resulted in an increase in the charge-discharge efficiency of the battery. This was inferentially achieved because the rate of intercalation and de-intercalation of Li between the active material and the electrolyte is determined by the ion conductivity of the electrolyte; the increase in the conductivity of the electrolyte in contact with the active material resulted in reduction in the resistance of intercalation and de-intercalation of Li.

The results of Example 4 and Comparative Example 2 in Table 1 have demonstrated the following. In the case of using, as the second solid electrolyte, a sulfide solid electrolyte, use of a positive-electrode material in which the surface of the positive-electrode active material was coated with a halide solid electrolyte resulted in an increase in the charge-discharge efficiency of the battery. This was inferentially achieved because the halide solid electrolyte having a high ion conductivity and high oxidation resistance suppressed oxidation of the sulfide solid electrolyte.

Batteries according to the present disclosure are usable as, for example, all-solid-state lithium secondary batteries.

What is claimed is:

1. A positive-electrode material comprising:

a positive-electrode active material;

a coating layer coating at least partially a surface of the positive-electrode active material and containing a first solid electrolyte; and a second solid electrolyte, wherein the first solid electrolyte is represented by Composition formula (2) below, $$Li_{6-2a-3d}Ca_a(Y_{1-b}Gd_b)_dBr_{6-c}Cl_c \quad \text{Formula (2)}$$

where

Composition formula (2) above satisfies $$0<a,$$

$$0<b<1,$$

$$0<c<6, \text{ and}$$

$$0<d<1.5.$$

2. The positive-electrode material according to claim 1, wherein Composition formula (2) above satisfies $0.01 \leq a \leq 0.3$.

3. The positive-electrode material according to claim 2, wherein Composition formula (2) above satisfies a≤0.2.

4. The positive-electrode material according to claim 1, wherein Composition formula (2) above satisfies 0.1≤b≤0.9.

5. The positive-electrode material according to claim 1, wherein Composition formula (2) above satisfies 0.8≤b<1.

6. The positive-electrode material according to claim 1, wherein Composition formula (2) above satisfies 1.0≤c≤1.2.

7. The positive-electrode material according to claim 1, wherein the second solid electrolyte is represented by Composition formula (3) below, $$Li_{\alpha 2}M2_{\beta 2}X2_{\gamma 2} \quad \text{Formula (3)}$$

where, in Composition formula (3) above,

α2, β2, and γ2 are each independently a positive real number,

M2 includes at least one element selected from the group consisting of metallic elements other than Li and metalloid elements, and X2 includes at least one selected from the group consisting of F, Cl, Br, and I.

8. The positive-electrode material according to claim 7, wherein M2 includes yttrium.

9. The positive-electrode material according to claim 7, wherein Composition formula (3) above satisfies 2.5≤α2≤3, 1≤β2≤1.1, and γ2=6.

10. The positive-electrode material according to claim 7, wherein X2 includes at least one selected from the group consisting of Cl and Br.

11. The positive-electrode material according to claim 7, wherein the second solid electrolyte contains $Li_3YBr_2Cl_4$.

12. The positive-electrode material according to claim 1, wherein the second solid electrolyte contains a sulfide solid electrolyte.

13. A battery comprising:

a positive electrode containing the positive-electrode material according to claim 7;

a negative electrode; and an electrolyte layer disposed between the positive electrode and the negative electrode.

14. A positive-electrode material comprising:

a positive-electrode active material; and a coating layer coating at least partially a surface of the positive-electrode active material and containing a first solid electrolyte, wherein the positive-electrode active material contains Ni, Co, and Mn, and wherein the first solid electrolyte is represented by Composition formula (2) below, $$Li_{6-2a-3d}Ca_a(Y_{1-b}Gd_b)_dBr_{6-c}Cl_c \quad \text{Formula (2)}$$

where

Composition formula (2) above satisfies $$0<a,$$

$$0<b<1,$$

$$0<c<6, \text{ and}$$

$$0<d<1.5.$$

* * * * *